United States Patent [19]

Atkinson

[11] Patent Number: 4,682,870
[45] Date of Patent: Jul. 28, 1987

[54] APPARATUS FOR ENCODING A FILM CARTRIDGE USED IN A PARTICULAR TYPE CAMERA

[75] Inventor: William C. Atkinson, Webster, N.Y.

[73] Assignee: Eastman Kodak Company, Rochester, N.Y.

[21] Appl. No.: 817,960

[22] Filed: Jan. 13, 1986

[51] Int. Cl.⁴ .................. G03B 17/26; G03B 13/10
[52] U.S. Cl. .................................. 354/275; 354/222
[58] Field of Search ............ 354/210, 222, 288, 289.1, 354/275; 242/71; 15/347

[56] References Cited

U.S. PATENT DOCUMENTS

| | | | |
|---|---|---|---|
| 3,490,844 | 1/1970 | Sapp | 354/222 X |
| 3,672,277 | 6/1972 | Kobayashi | 354/275 X |
| 3,722,387 | 3/1973 | Walther | 354/275 |
| 3,918,075 | 11/1975 | Horn et al. | 354/275 X |
| 3,929,437 | 12/1975 | Gaudry | 15/347 X |
| 4,153,350 | 5/1979 | Kluczynski et al. | 352/78 R |
| 4,338,015 | 7/1982 | Holmes | 354/275 |
| 4,478,493 | 10/1984 | Yokota | 354/222 X |

FOREIGN PATENT DOCUMENTS

1248463 10/1964 Fed. Rep. of Germany ..... 242/71.1
1523414 8/1978 United Kingdom ............... 242/71.1

Primary Examiner—Donald A. Griffin
Attorney, Agent, or Firm—Roger A. Fields

[57] ABSTRACT

A particular type camera requiring the exposed film to receive special handling at the photofinisher is adapted for use with a film cartridge which includes a film spool having an elongate coaxial hole open at one end of the spool and a readily fracturable element located within the coaxial hole. When the cartridge is loaded in the camera, a shaft member of the camera is received in the coaxial hole to fracture the fracturable element and thereby provide an indication to the photofinisher that the cartridge was used in the camera. Preferably, the shaft member is keyed to engage an integral rib of the film spool to rewind the exposed film into the cartridge.

18 Claims, 19 Drawing Figures

| OPERATING MODE | PSEUDO PAN | ACTUAL ZOOM | | PSEUDO TELE (ZOOM) | | |
|---|---|---|---|---|---|---|
| CAMERA OBJECTIVE: | | | | | | |
| ACTUAL FOCAL LENGTH | 35mm | 35mm ↔ 80mm | | 80mm | 80mm | 80mm |
| MAGNIFICATION | 1.0X | 1.0X ↔ 2.3X | | 2.3X | 2.3X | 2.3X |
| EQUIVALENT FOCAL LENGTH | | SAME AS ACTUAL | | 120mm | 160mm | 200mm |
| MAGNIFICATION | 1.0X | 1.0X ↔ 2.3X | | 3.4X ↔ 4.6X ↔ 5.7X | | |
| FINDER IMAGE | 1:2 | 3½:5 | 3½:5 | 3½:5 | 3½:5 | 3½:5 |
| WIDTH-TO-LENGTH RATIO | | | | | | |
| PORTION OF NEGATIVE USED TO MAKE PRINT | | | | | | |
| PRINT SIZE | 3½ x 7 ins | 3½ x 5 ins | 3½ x 5 ins | 3½ x 5 ins | 3½ x 5 ins | 3½ x 5 ins |
| CODE FIDUIAL | 1000 | 0000 | 0000 | 0100 | 0010 | 0001 |

APPARATUS FOR ENCODING A FILM CARTRIDGE USED IN A PARTICULAR TYPE CAMERA

CROSS-REFERENCE TO RELATED APPLICATIONS

Reference is made to commonly assigned, copending patent applications Ser. No. 765,977, filed Aug. 15, 1985 in the name of Donald M. Harvey and entitled PSEUDO FORMAT CAMERA AND SPECIAL FILM CARTRIDGE, Ser. No. 775,271, filed Sep. 12, 1985 in the name of Donald M. Harvey and entitled CAMERA DEVICE FOR ENCODING CONVENTIONAL FILM CARTRIDGE, Ser. No. 775,296, filed Sep. 12, 1985 in the name of David E. Beach and entitled APPARATUS AND METHOD FOR IDENTIFYING A FILM CARTRIDGE USED IN A PARTICULAR TYPE CAMERA and Ser. No. 781,616, filed Sep. 30, 1985 in the name of Jeffrey R. Stoneham and entitled APPARATUS AND METHOD FOR IDENTIFYING A FILM CARTRIDGE.

BACKGROUND OF THE INVENTION

1. Field of the Invention

The invention relates to apparatus for encoding a film cartridge to provide an indication that the cartridge was used in a particular type camera which requires the exposed film to receive special handling at the photofinisher. An example of such a camera is one that takes exposures for use in producing pseudo telephoto and pseudo panoramic prints. With a pseudo format camera, it is preferable to encode film cartridges used in the camera in order to correctly route the cartridges to special equipment at the photofinisher for producing pseudo format prints.

2. Description of the Prior Art

A pseudo telephoto print is one that is made from a central portion of an exposure having the same width-to-length ratio, e.g., $3\frac{1}{2}:5$, as that of the exposure. During the printing process, the negative is masked at its upper, lower, left and right marginal zones, leaving the central portion of the negative unobscured. Alternatively, the film gate in the enlarger may be correspondingly masked or adjusted. Then, an enlargement is made of the central portion of the negative to provide a print with the same width-to-length ratio as that of the central portion. Thus, the print will have a telephoto or close-up format.

A pseudo panoramic print is one that is made from a narrow portion of an exposure having a greater width-to-length ratio, e.g., 1:3, than that of the exposure. During the printing process, the negative is masked at its upper and/or lower marginal zones, leaving the narrow portion of the negative unobscured. Alternatively, the film gate in the enlarger may be correspondingly masked or adjusted. Then an enlargement is made of the narrow portion of the negative to provide a print with the same width-to-length ratio as that of the narrow portion. Thus, the print will have a panoramic or elongate format.

Commonly assigned U.S. Pat. No. 3,490,844, granted Jan. 20, 1970, discloses a method of making a print of a selected portion of a subject to be photographed. The method comprises the following steps: (1) viewing the subject in the viewfinder of a camera; (2) manually adjusting mechanical masking members visible in the viewfinder to frame a selected portion of the subject; (3) exposing the film in the camera to obtain a latent image of the subject; (4) encoding the exposure on the film with indicia which represents the selected portion of the subject; (5) processing the film to obtain a negative of the latent image of the subject; and (6) sensing the indicia to make a print of the selected portion of the subject from the negative.

When, in U.S. Pat. No. 3,490,844, the selected portion of the subject has the same relative position in the viewfinder as a corresponding portion of the exposure, enlargement of the portion in the negative will provide a pseudo telephoto effect similar to the actual telephoto effect provided by a telephoto lens. Thus, a pseudo telephoto print can be made during the printing process from an exposure taken without a telephoto lens.

Another patent, U.S. Pat. No. 4,357,102, granted Nov. 2, 1982, discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2 and preferably 1:3. Exposures are taken with the window partially masked and, during the printing of the negatives, the film gate in the enlarger is correspondingly masked or provided with an aperture of the same width-to-length ratio as that of the unobscured portion of the window. Printing paper with a similar width-to-length ratio is used. Prints can thus be obtained which have a panoramic or elongate format, without using a panoramic lens.

Although U.S. Pat. No. 3,490,844 discloses a method of making pseudo telephoto prints from exposures taken without a telephoto lens, and U.S. Pat. No. 4,357,102 discloses a method of making pseudo panoramic prints from exposures taken without a panoramic lens, in each instance the exposures are made on film in a conventional (standard) cartridge. Thus, unless otherwise provided by the photographer, there is no indication to the photofinisher that the conventional cartridge was used in a pseudo telephoto or pseudo panoramic camera rather than a regular format camera. During the photofinishing process, a cartridge containing film on which exposures have been made for use in producing pseudo telephoto or pseudo panoramic prints will be indistinguishable from a cartridge containing film on which exposures have been made for use in producing normal prints. Consequently, film on which exposures have been made for use in producing pseudo telephoto or pseudo panoramic prints may not be correctly routed to the special equipment described in the patents for producing pseudo format prints.

The Cross-Referenced Applications

Several commonly assigned, copending applications are cross-referenced above for informational purposes. These applications disclose various means for identifying a film cartridge used in a pseudo format camera.

SUMMARY OF THE INVENTION

According to the invention, a film cartridge is encoded to provide an indication that the cartridge was used in a particular type camera which requires the exposed film to receive special handling at the photofinisher, such as in the foregoing example of a pseudo format camera. The film cartridge includes a film spool having an elongate coaxial hole open at one end of the spool and a readily fracturable element located within the coaxial hole. When the cartridge is loaded in the camera, a shaft member of the camera is received in the coaxial hole to fracture or deform the fracturable element. This will provide an indication to the photofinisher that the cartridge was used in the camera.

In a preferred embodiment of the invention, the shaft member of the pseudo format camera is a film rewind shaft which is keyed to engage a rib fixed in the coaxial hole in the film spool of the cartridge. Rotation of the keyed shaft in engagement with the rib will rotate the film spool to rewind the exposed film into the cartridge. A thinned portion of the rib is located opposite the open end of the spool to be fractured by a fracturing member of the keyed shaft in response to engagement of the shaft with the rib. The fractured portion of the rib thus serves as an indication to the photofinisher that the cartridge was used in the pseudo format camera.

Accordingly, with the invention, the photofinisher can readily identify the cartridge as one that was used in a particular type camera, such as the pseudo format camera, and the cartridge can then be routed to special equipment for producing pseudo format prints. When instead the cartridge is used with a regular format camera, the fracturable element remains intact, informing the photofinisher that the cartridge does not require special handling.

BRIEF DESCRIPTION OF THE DRAWINGS

The invention will be described in connection with the drawings, wherein.

DESCRIPTION OF THE PREFERRED EMBODIMENT

The invention is disclosed as being embodied preferably in a single-lens-reflex (SLR) 35 mm camera having a zoom objective lens. Because such a camera and lens are well known, this description is directed in particular to photogaphic elements forming part of or cooperating directly with the disclosed embodiment. It is to be understood, however, that other elements not specifically shown or descibed may take various forms known to persons of ordinary skill in the art.

Figure 1:
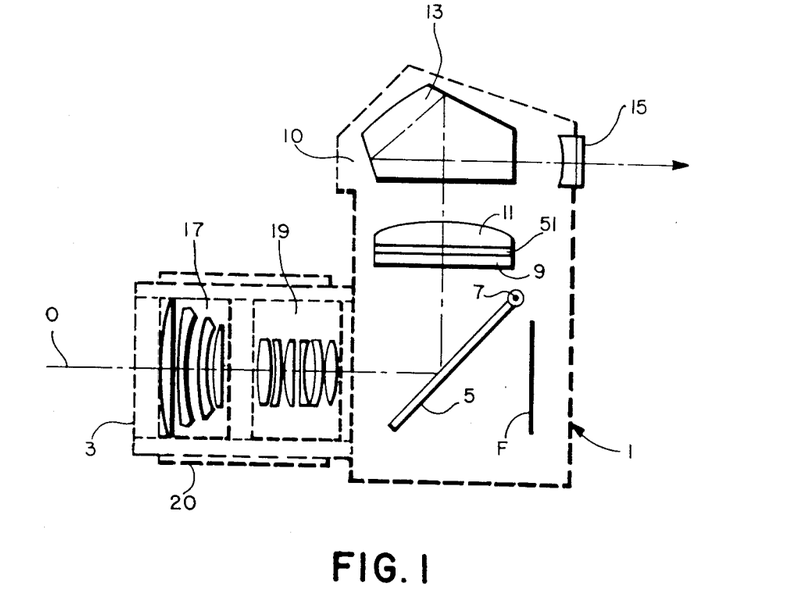
FIG. 1 is a schematic diagram of a single-lens-reflex (SLR) camera for taking exposures for use in producing pseudo telephoto and pseudo panoramic prints.

Referring now to the drawings, and in particular to FIG. 1, there is shown a single-lens-reflex (SLR) 35 mm camera 1. The camera 1 includes an objective lens 3 for focusing an image of a subject being photographed on a frame section F of film in the camera. Conventional means, such as a pressure plate and a pair of rails, not shown, support the film frame F in the focal plane of the objective lens 3 to take an exposure. A flip-up mirror 5 is located between the objective lens 3 and the film frame F. The mirror 5 is normally disposed at an angle of 45°, centered on the optical axis O of the objective lens 3, but can flip up about a pivot pin 7 to lie flat. When the mirror 5 is disposed at the 45° angle, it reflects the rays of light that come through the objective lens 3 onto a ground glass screen 9 in a viewfinder 10 of the camera 1. A field lens 11 and a penta-roof prism 13 in the viewfinder 10 direct the light rays through an eye-lens 15 at the rear of the camera 1 to enable the subject to be photographed to be viewed through the objective lens 3. The prism 13 has three reflecting surfaces which turn the image formed by the objective lens 3 on the ground glass screen 9 upright as well as right-way-round. When the mirror 5 is flipped up to lie flat, it covers the underside of the ground glass screen 9 and the light rays from the objective lens 3 fall on the film frame F. The position of the mirror 5 is so arranged that when an image of the subject to be photographed is focused on the ground glass screen 9, with the mirror at the 45° angle, the same image falls into focus on the film frame F when the mirror is flipped out of the way. Finger pressure against a shutter release, not shown, on the outside of the body of the camera 1 flips the mirror 5 up. At first the light rays fall only on the blind of a focal plane shutter, not shown, but as the mirror 5 reaches the upper limit of its travel, it presses against a stop which releases the shutter blades to make the exposure.

Figure 3:
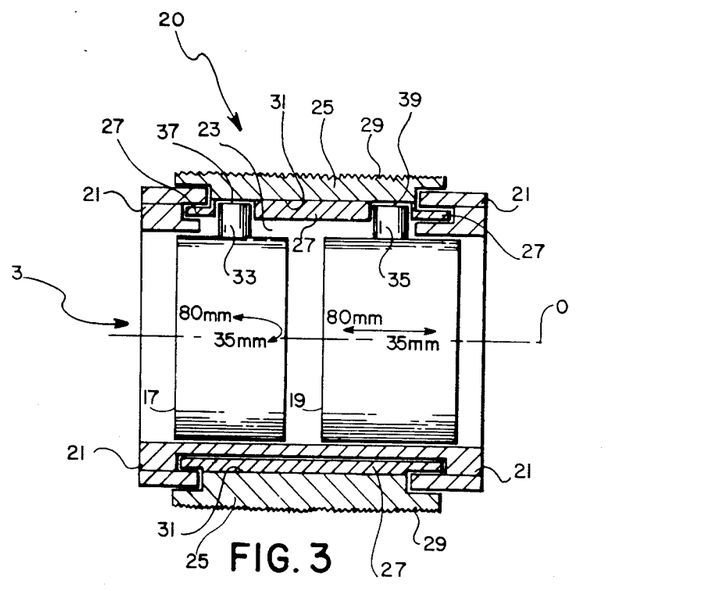
FIG. 3 is a partial sectional view of the camera objective and the manually operated member.
Figure 4:
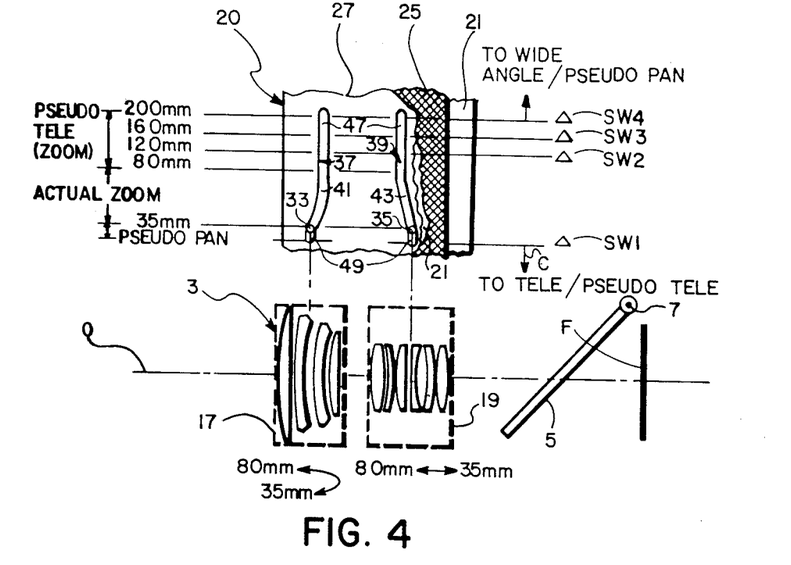
FIG. 4 a schematic diagram of the camera objective and the manually operated member.

The objective lens 3 in the camera 1 is a known type of zoom lens, that is, a lens of variable focal length which can be adjusted continuously by movement of separate groups of elements in the lens to change the focal length of the lens. This is done in order to vary the angular field of view (coverage) of the objective lens 3 between a wide-angle limit and a telephoto limit. Alternatively, a lens assembly may be provided having a plurality of interchangable elements for changing the focal length or angular field of view. As shown in FIGS. 1, 3 and 4, the objective lens 3 includes a front four-element section 17 which moves in a double action path along the optical axis O, first back (rearward) and then forward as the focal length of the lens is changed from a wide angle limit of, for example, 35 mm, to a telephoto limit of, for example, 80 mm. Conversely, a rear six-element section 19 of the objective lens 3 moves forward along the optical axis O in an almost smooth, linear path as the focal length of the lens is adjusted from 35 mm to 80 mm. At the shortest focal length of the objective lens 3, i.e., the wide-angle limit 35 mm, the front and rear sections 17 and 19 of the lens are farthest apart and the angular field of view is approximately 63°. At the longest focal length of the objective lens 3, i.e., the telephoto limit 80 mm, the angular field of view is approximately 28°. Thus, the field range of the objective lens 3 is 63° to 28°.

Figure 2:
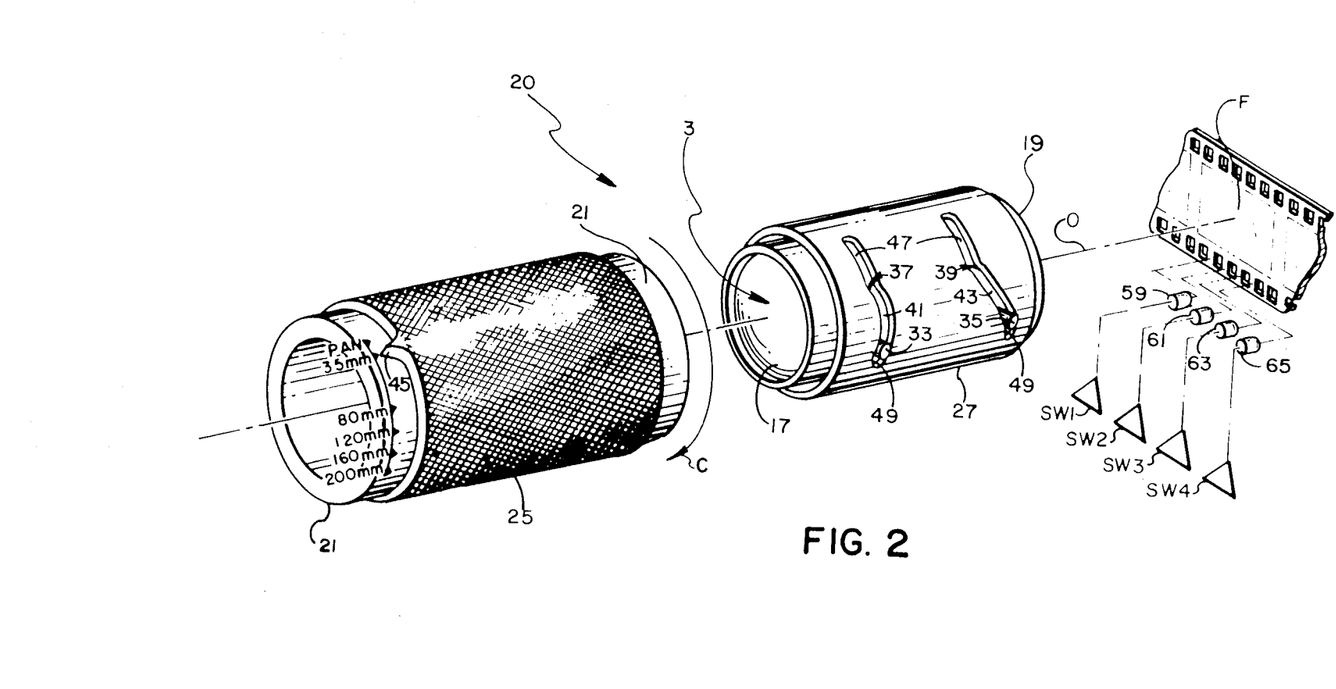
FIG. 2 is an exploded perspective view of the camera objective, manually operated member for selecting a pseudo telephoto or pseudo panoramic field of view in the camera viewfinder, and code means for encoding an exposure with indicia representative of the selected pseudo field of view.

Manually operated means 20 for moving the front and rear sections 17 and 19 of the objective lens 3 to adjust the lens to a selected focal length from 35 mm to 80 mm is shown in FIGS. 2–4. FIG. 2 shows the manually operated means 20 in an exploded perspective form. FIG. 3 shows such means 20 in a sectional form. FIG. 4 shows the means 20 in a rolled out (flat) elevational form. As seen in FIG. 3, a cylindrical barrel 21 fixed to the camera body supports the front and rear sections 17 and 19 of the objective lens 3 for movement along the optical axis O. The fixed barrel 21 has a semi-annular opening 23 which is bridged in light-trapping relation by an exterior zoom ring 25 and an interior cam ring 27. The zoom ring 25 has a knurled outer surface 29 and is secured at an inner surface 31 to the cam ring 27. The respective rings 25 and 27 are supported on exterior and interior surfaces of the barrel 21 for rotation relative to the barrel, about the front and rear sections 17 and 19 of the objective lens 3. The front and rear sections 17 and 19 have respective cam followers 33 and 35 which project into different-shaped cam slots 37 and 39 in the cam ring 27 to adjust the objective lens 3 from its 35 mm focal length to its 80 mm focal length or vice-versa. The different shape of the cam slots 37 and 39, and respective settings of the cam ring 27 for adjusting the objective lens 3 to the 35 mm focal length and the 80 mm focal length, are depicted in FIGS. 2 and 4. When, as viewed in FIGS. 2 and 4, the cam ring 27 is rotated in a clockwise direction C (by turning the zoom ring 25 in the same direction) from the 35 mm setting to the 80 mm setting of the cam ring, the front section 17 of the objective lens 3 first moves rearward and then moves forward because of a curved segment 41 of the cam slot 37. Simultaneously, the rear section 19 of the objective lens 3 simply moves forward because of a straight, inclined segment 43 of the cam slot 39. This movement of the front and rear sections 17 and 19 adjusts the objective lens 3 to continuously change its focal length from 35 mm to 80 mm.

A pointer 45 is provided on the zoom ring 25 for alignment with respective visible indications of the 35 mm and 80 mm settings of the cam ring 27. As shown in FIG. 2, the indications are embossed on the outside of the cylindrical barrel 21.

As is apparent from FIG. 4, the cam ring 27 can be rotated in the clockwise direction C beyond its 80 mm setting (by similarly turning the zoom ring 25) to a plurality of pseudo telephoto settings, 120 mm, 160 mm and 200 mm, without moving the objective lens 3 from its longest (telephoto) focal length 80 mm. This is possible because of respective, non-inclined, identical dwell segments 47 in the two cam slots 37 and 39. Conversely, the cam ring 27 can be rotated in a counter-clockwise direction beyond its 35 mm setting (by similarly turning the zoom ring 25) to a pseudo panoramic setting, without moving the objective lens 3 from its shortest (wide-angle) focal length 35 mm. This is possible because of respective, non-inclined, identical dwell segments 49 in the two cam slots 37 and 39. Visible indications of the pseudo telephoto settings 120 mm, 160 mm and 200 mm of the cam ring 27 and the pseudo panoramic setting of the cam ring are embossed on the outside of the cylindrical barrel 21, beyond the 80 mm and 35 mm indications on the barrel, for alignment with the pointer 45 on the zoom ring 25.

Figure 5A:
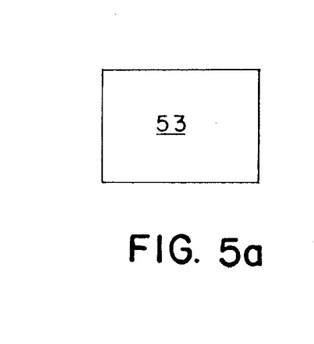
FIGS. 5a-5e are elevation views of the finder field in the camera viewfinder, illustrating operation of a liquid crystal display (LCD) masking unit for partially masking the viewing area in various degrees corresponding to the selected pseudo field of view.
Figure 5B:
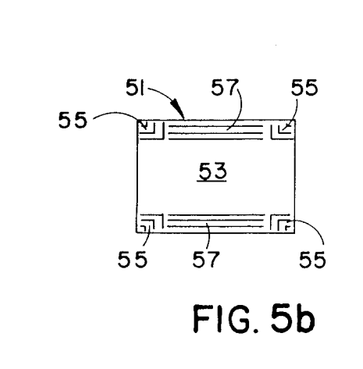
Figure 5C:
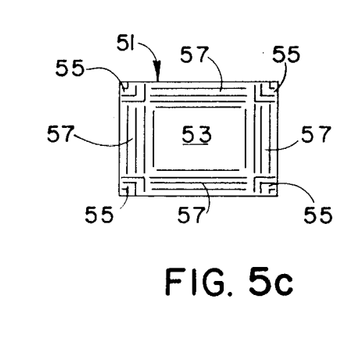
Figure 5D:
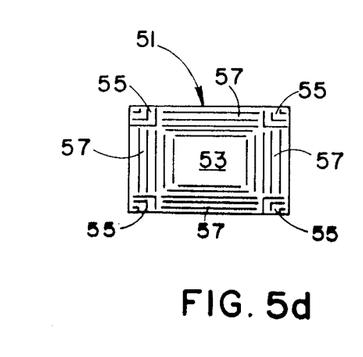
Figure 5E:
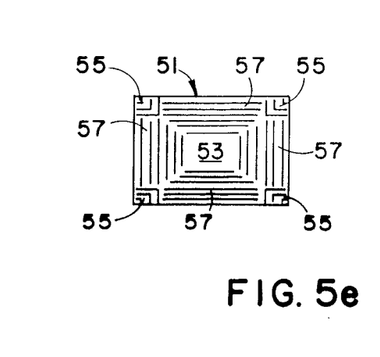

A flat, liquid crystal display (LCD) masking unit 51 is located in the viewfinder 10 of the camera 1 between the ground glass screen 9 and the field lens 11, as shown in FIG. 1. The LCD masking unit 51 is a variation of a known type of unit, such as described in U.S. Pat. No. 4,478,493, granted Oct. 23, 1984, and is depicted in FIGS. 5b–5e in various masking configurations in the finder field 53 of the viewfinder 10. The respective configurations correspond to the pseudo panoramic and pseudo telephoto settings of the cam ring 27. As shown in FIG. 5e, the masking unit 51 comprises four sets of right-angle insulated strips 55 of transparent, electrically conductive material arranged in side-by-side relation in the respective corner zones of the finder field 53 and four sets of elongate insulated strips 57 of the same material arranged in side-by-side relation in the upper, lower, left and right marginal zones of the finder field. Preferably, each set of the right-angle strips 55 includes three strips, and each set of the elongate strips 57 includes six strips. When the right-angle strips 55 and the elongate strips 57 are selectively energized in accordance with the pseudo panoramic or pseudo telephoto settings of the cam ring 27, they are individually rendered opaque to partially mask the finder field 53 in various degrees, as shown in FIGS. 5b–5e. FIG. 5a illustrates the finder field 53 as it appears with the masking unit 51 de-energized, which is the situation when the cam ring 27 is rotated from its 35 mm setting to its 80 mm setting or vice-versa. In this instance, none of the right-angle strips 55 or the elongate strips 57 are visible in the finder field 53. FIG. 5b illustrates the finder field 53 as it appears with the masking unit 51 minimally energized to provide a pseudo panoramic format, which is the situation when the cam ring 27 is in its pseudo panoramic setting. In this instance, three of the elongate strips 57 in the upper and lower marginal zones and all of the right-angle strips 55 in the corner zones are visible in the finder field 53. FIG. 5c illustrates the finder field 53 as it appears with the masking unit 61 further energized to provide a pseudo telephoto format akin to a 120 mm focal length, which is the situation when the cam ring 27 is in its 120 mm pseudo telephoto setting. In this instance, four of the elongate strips 57 in the upper, lower, left and right marginal zones and all of the right-angle strips 55 in the corner zones are visible in the finder field 53. FIG. 5d illustrates the finder field as it appears with the masking unit even further energized to provide a pseudo telephoto format akin to a 160 mm focal length, which is the situation when the cam ring is in its 160 mm pseudo telephoto setting. In this instance, five of the elongate strips in the marginal zones and all of the right-angle strips in the corner zones are visible in the finder field. FIG. 5e illustrates the finder field as it appears with the masking unit completely energized to provide a pseudo telephoto format akin to a 200 mm focal length, which is the situation when the cam ring is in its 200 mm pseudo telephoto setting. In this instance, all of the elongate strips and all of the right-angle strips are visible in the finder field.

In contrast to the electrically controlled LCD masking unit 51, a mechanically controlled masking unit may be provided in the viewfinder 10 of the camera 1. An example of a mechanical unit is shown in U.S. Pat. No. 3,212,422, granted Oct. 19, 1965. Alternatively, in place of the LCD masking unit 51, there may be provided a viewfinder having a manually operated carriage or slide on which is mounted a series of lenses and/or apertures of different sizes corresponding to the pseudo telephoto and pseudo panoramic formats. The slide would be supported for movement across the viewing axis of the viewfinder to locate the respective lenses and/or apertures at the axis to see a selected pseudo format in the viewfinder. In addition to the lenses and/or apertures for viewing the pseudo formats, the slide may include one or more lenses for viewing regular formats, e.g., 50 mm.

Four light emitting diodes (LED's) 59, 61, 63 and 65 are disposed in evenly spaced relation in the camera 1 for selective energization to spot-expose one of several possible code fiducials in binary form on a sensitive film area adjacent the film frame F, as shown in FIG. 2. Selective energization of the LED's 59, 61, 63 and 65 is controlled by individually closing respective switches SW1, SW2, SW3 and SW4. The closing of a switch SW1, SW2, SW3 or SW4 may be effected by a single closure member, not shown, on the cam ring 27 as the cam ring is positioned selectively in its pseudo panoramic and pseudo telephoto settings, i.e., pan, 120 mm, 160 mm and 200 mm. The binary form of the resulting code fiducial adjacent the film frame F indicates the particular pseudo setting of the cam ring 27, that is, the selected pseudo format. When the cam ring 27 is in its pseudo panoramic setting, the switch SW1 is closed and the LED 59 is energized. Thus, the binary form of the code fiducial is 1000. When the cam ring 27 is in its 120 mm, 160 mm or 200 mm pseudo telephoto settings, the switches SW2, SW3 or SW4 are closed and the LED's 61, 63 or 65 are energized, respectively. Thus, the binary form of the code fiducial is 0100, 0010 or 0001. When the cam ring 27 is rotated from its 35 mm setting to its 80 mm setting or vice-versa, the switches SW1-SW4 are open and none of the LED's are energized. Thus, the binary form of the code fiducial is, in effect, 0000.

Although not shown, it may be desirable for the LED 59 to be energized each time the cam ring 27 is in a pseudo panoramic or pseudo telephoto setting. In this instance, the LED 59 would provide a reference or pseudo-indicator fiducial for use in the printing process and the LED's 61, 63 and 65 would provide the code fiducials. Thus, the various codings might be 1000, 1100, 1010 and 1001 for the panoramic, 120 mm, 160 mm and 200 mm pseudo settings, respectively.

Besides controlling selective energization of the LED's 59, 61, 63 and 65 in accordance with rotation of the cam ring 27 to its pseudo panoramic and pseudo telephoto settings, the switches SW1-SW4 similarly control selective energization of the right-angle strips 55 and the elongate strips 57 of the LCD masking unit 51. Thus, the resulting code fiducial 1000, 0100, 0010 or 0001 adjacent the film frame F will be consistent with the masking configuration in the finder field 53 of the viewfinder 10.

Figure 6:
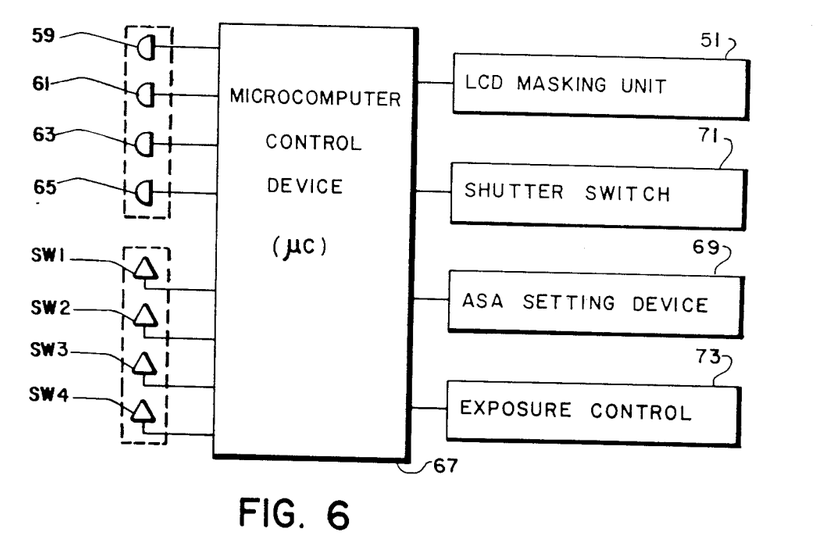
FIG. 6 is a schematic diagram of control circuitry in th SLR camera.

FIG. 6 depicts a known microcomputer control device 67 which operatively couples the switches SW1-SW4 with the LCD masking unit 51 and the LED's 59, 61, 63 and 65. Examples of microcomputer-controlled cameras are disclosed in U.S. Pat. Nos. 4,295,715 and 4,509,843. A known ASA (film speed) setting device 69 is connected to the microcomputer device 67 to limit the intensity of an energized LED in accordance with the particular film speed of the 35 mm film loaded in the camera 1. A shutter switch 71 is connected to the microcomputer device 67 to delay energization of an LED, even though one of the switches SW1-SW4 is closed, until a focal plane shutter, not shown, is opened to take an exposure. When the focal plane shutter is opened, the shutter switch 71 is closed to energize an LED. Conversely, closing of the focal plane shutter causes the shutter switch 71 to re-open, thereby de-energizing the LED. A conventional exposure control circuit 73 is connected to the microcomputer device 67 to control the diaphragm aperture and the shutter speed. Such a circuit is disclosed, for example, in U.S. Pat. Nos. 4,493,547 and 4,515,457. The microcomputer device 67 may include a typical look-up table of exposure values which are individually selected according to which one of the switches SW1-SW4 is closed and the measure of brightness of reflected light provided by a photocell in the exposure control circuit 73. The selected exposure value is inputted to the exposure control circuit to set the diaphragm aperture and the shutter speed.

Figure 7:
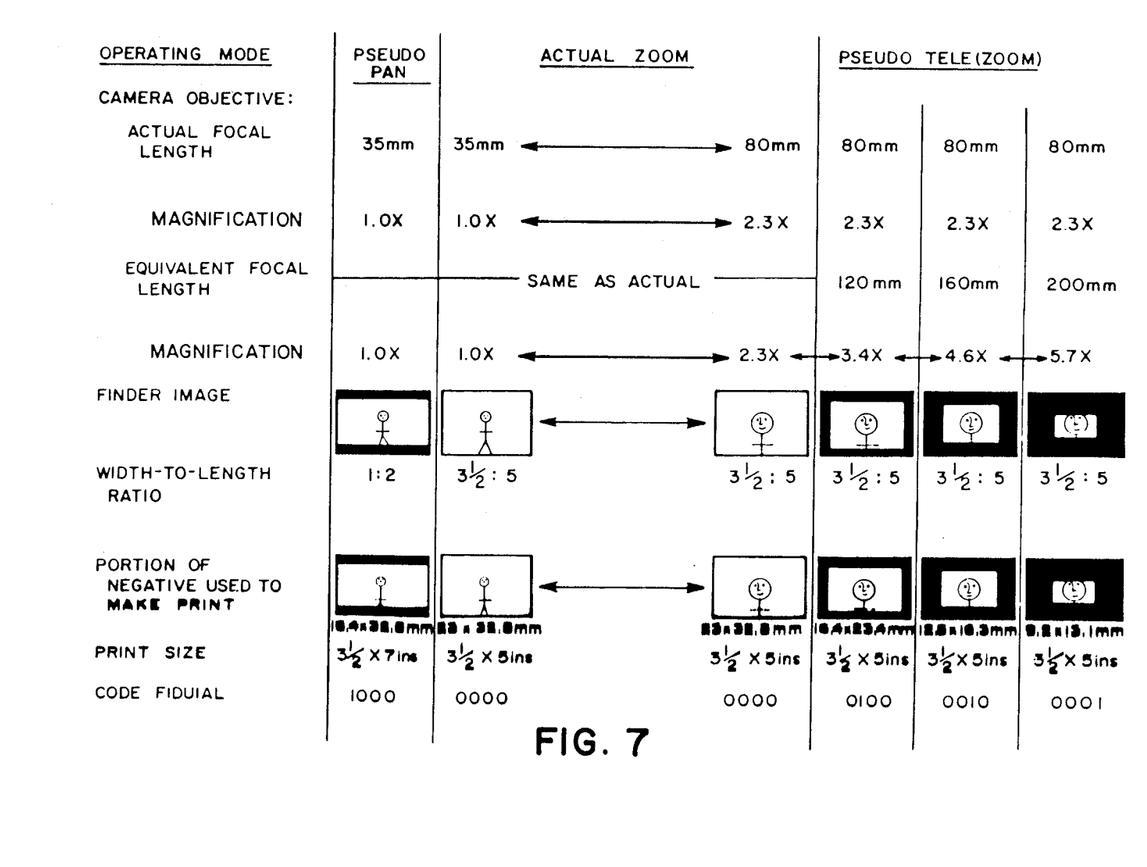
FIG. 7 is a chart for explaining how pseudo telephoto and pseudo panoramic prints are produced from film exposed in the SLR camera.

Referring now to FIG. 7, there is shown a chart for understanding how the camera 1 is used to exposure film frames from which pseudo panoramic and pseudo telephoto prints (as well as actual wide-angle to actual telephoto prints) can be obtained. For the most part, the chart is self-explanatory. For example, when the cam ring 27 is in its pseudo panoramic setting, the actual focal length of the objective lens 3 is the wide angle limit 35 mm. The finder field 53 is masked as indicated and the code fiducial 1000 is exposed adjacent the film frame F in response to the closing of the switch SW1. During the printing operation, sensing of the code fiducial 1000 causes the negative to be masked along its upper and lower marginal zones as indicated, in conformity with the masking of the finder field 53. An enlargement is made of the narrowed, non-masked portion of the negative, i.e., 16.4×32.8 mm, to provide a pseudo panoramic 3½×7 ins. print similar to one obtained from an exposure made with a panoramic (rather than a 35 mm) lens. When the cam ring 27 is in its 200 mm pseudo telephoto setting, the actual focal length of the objective lens 3 is the telephoto limit 80 mm. The finder field 53 is masked as indicated and the code fiducial 0001 is exposed adjacent the film frame F in response to the closing of the switch SW4. During the printing operation, sensing of the code fiducial 0001 causes the negative to be masked along its upper, lower, left and right marginal zones as indicated, in conformity with the masking of the finder field. An enlargement is made of the central, non-masked portion of the negative, i.e., 9.2×13.1 mm, to provide a pseudo telephoto 3½×5 ins. print similar to one obtained from an exposure made with a 200 mm (rather than an 80 mm) lens. When the cam ring 27 is in its 120 mm telephoto setting, the actual focal length of the objective lens 3 is the telephoto limit 80 mm. The finder field 53 is masked as indicated and the code fiducial 0100 is exposed adjacent the film frame F in response to the closing of the switch SW2. During the printing operation, sensing of the code fiducial 0100 causes the negative to be masked along its upper, lower, left and right marginal zones as indicated, in conformity with the masking of the finder field. An enlargement is made of the central, non-masked portion of the negative, i.e., 16.4×23.4 mm, to provide a pseudo telephoto 3½×5 ins. print similar to one obtained from an exposure made with a 120 mm (rather than a 80 mm) lens. When the cam ring is rotated from its 35 mm setting to its 80 mm setting or vice-versa, the focal length of the objective lens 3 is continuously changed between 35 mm and 80 mm. The finder field is not masked and no code fiducial (0000) is exposed on the film frame F, since each of the switches SW1-SW4 is open. Thus, an enlargement is made of a substantial portion of the negative, i.e., 23×32.8 mm.

Figure 8:
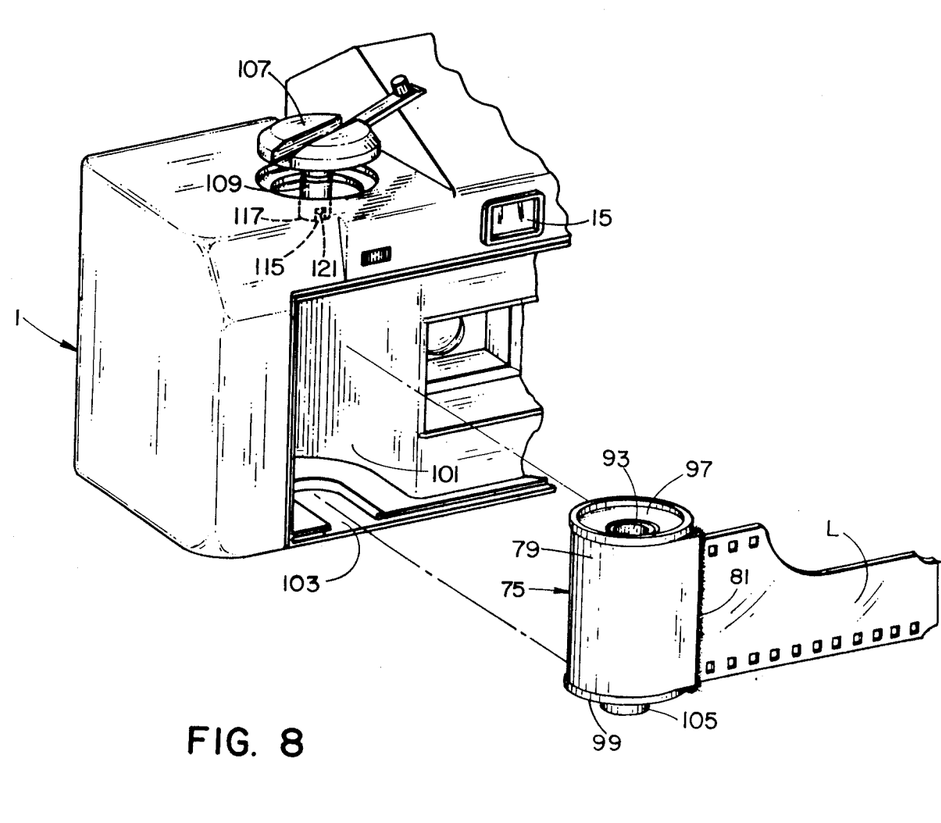
FIG. 8 is a rear perspective view of a film cartridge for use with the SLR camera according to a preferred embodiment of the invention.
Figure 9:
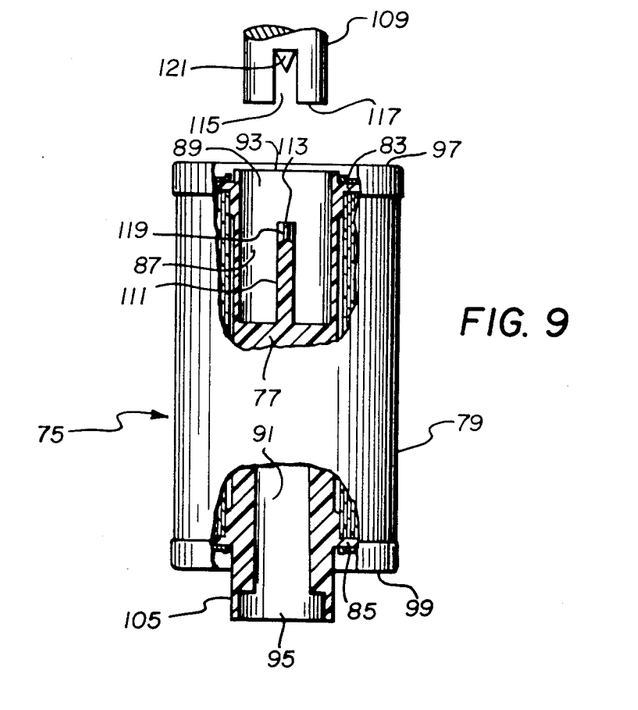
FIG. 9 is an elevation view of the preferred cartridge, partly in section, and a film rewind shaft of the SLR camera.
Figure 10:
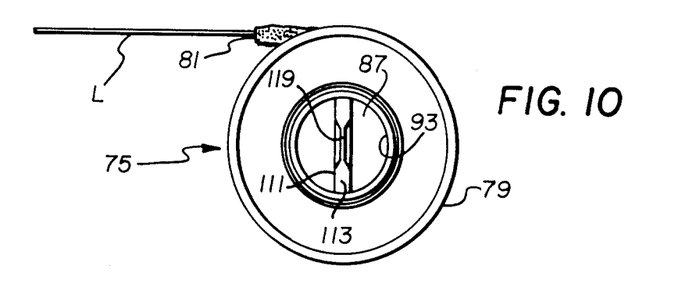
FIG. 10 is an end view of the preferred cartridge.

FIGS. 8-10 depict a film cartridge 75 for use with the pseudo format camera 1. The film in the cartridge 75 is wound on a spool 77 which is rotatable within a cylindrical light-tight container 79. A leading end portion, i.e., the leader L, of the film protrudes from a light-trapped slit or 'mouth' 81 in the cylindrical container 79. As shown in FIG. 9, the spool 77 includes a pair of parallel spaced, annular flanges 83 and 85 and a core 87 extending between the flanges. The core 87 has a relatively short coaxial hole 89 and a relatively long coaxial hole 91. Respective openings 93 and 95 to the shorter and longer coaxial holes 89 and 91 are disposed at opposite ends 97 and 99 of the core 87. The two end openings 93 and 95 are accessible from outside of the cylindrical container 79 to gain entry into the shorter and longer coaxial holes 89 and 91.

As shown in FIG. 8, the pseudo format camera 1 includes a rear loading chamber 101 for receiving the cartridge 75 sidewise. A recess 103 is formed in the bottom of the loading chamber 101 to admit a relatively short extension 105 of the core 87 of the spool 77, when the cartridge 75 is in the loading chamber. The short extension 105 projects from the cylindrical container 79 of the cartridge 75 to permit the spool 77 to be manually rotated, for example to shorten the film leader L before inserting the cartridge into the loading chamber 101. A film rewind knob 107 of the camera 1 can be manually rotated to rewind exposed film into the cartridge 75 after the length of film has been exposed in the camera. The knob 107 is axially movable and has a keyed shaft 109 which thus can be inserted through the end opening 93 into the shorter coaxial hole 89 in the core 87 to engage a mating rib 111 which extends across the coaxial hole. As shown in FIG. 9, the rib 111 is integrally formed with the core 87 and has an end portion 113 which fits into a split 115 in a leading end 117 of the keyed shaft 109 to engage with the shaft. Rotation of the knob 107, therefore, will rotate the film spool 77.

According to a preferred embodiment of the invention, the end portion 113 of the rib 111 has a thinned section 119, shown in FIGS. 9 and 10, which is readily fracturable to provide a visible indication to the photofinisher that the cartridge 75 was used in the pseudo format camera 1. A pointed-end fracturing member 121 is disposed in the split 115 in the leading end 117 of the keyed shaft 109 to fracture the thinned section 119 in response to engagement of the shaft with the rib 111. Thus, with the thinned section 119 fractured, the photofinisher can identify the cartridge 75 as one that was used in the pseudo format camera 1, and the cartridge can then be routed to special equipment for producing pseudo format prints. When, instead, the cartridge 75 is used with a regular format camera, the keyed shaft in such camera does not include the fracturing member 121. Thus, the thinned section 119 will remain intact, informing the photofinisher the the cartridge does not require special handling.

Figure 11:
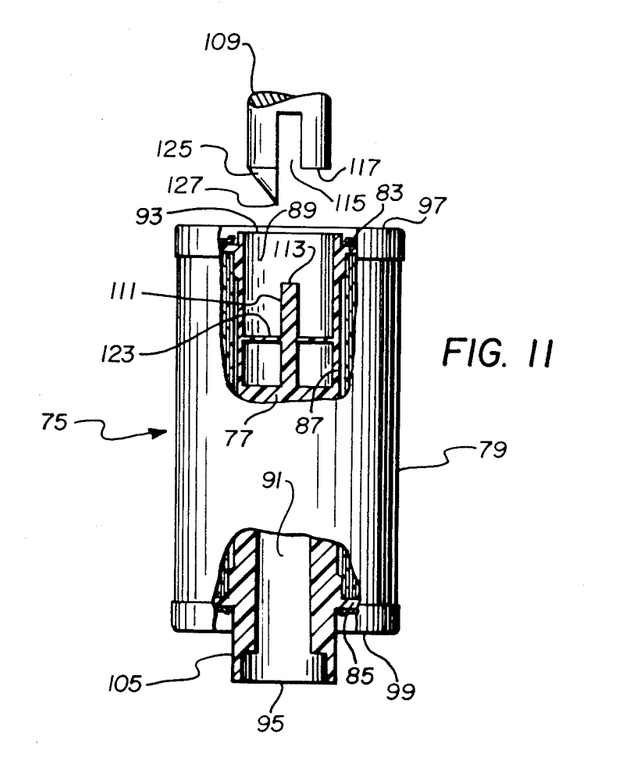
FIG. 11 is an elevation view of a second cartridge, partly in section, and a film rewind shaft for use with this cartridge according to an alternate embodiment of the invention.
Figure 12:
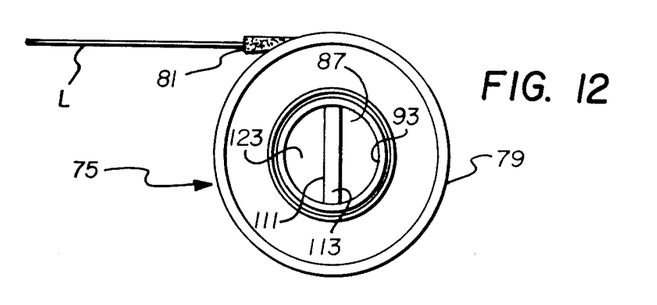
FIG. 12 is an end view of the second cartridge.

Alternatively, in place of the fracturable thinned section 119, there is shown in FIGS. 11 and 12 a fracturable disk-like member 123 surrounding the rib 111 in fixed relation at a location in the shorter coaxial hole 89 remote from the end opening 93 to that hole. Those elements in FIGS. 11 and 12 which are the same as in FIGS. 8-10 have like reference numbers. In FIG. 11, the keyed shaft 109 does not include the fracturing member 121, but instead has an extension 125. The extension 125 is formed with a pointed end 127 for fracturing the disk-like element 123 in response to engagement of the keyed shaft 109 with the rib 111, thereby providing a visible indication to the photofinisher that the cartridge 75 was used in the pseudo format camera 1.

Figure 13:
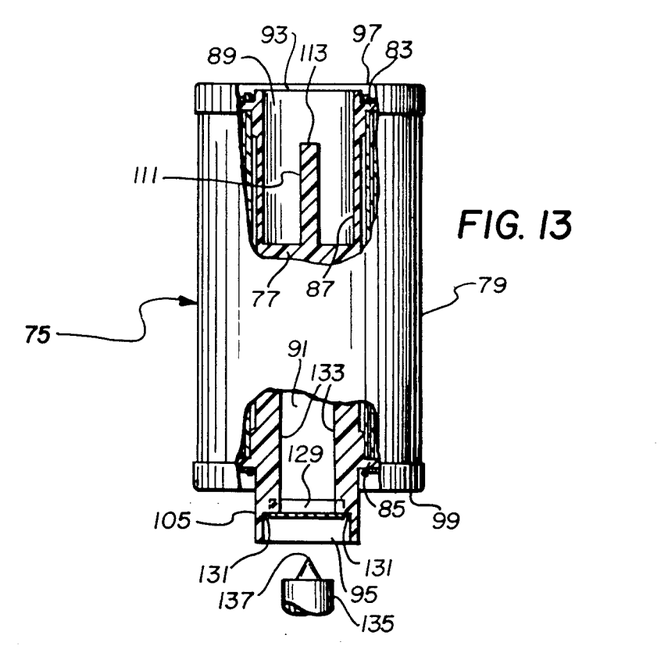
FIG. 13 is an elevation view, partly in section, of a third cartridge and a support shaft for use with this cartridge according to another embodiment of the invention.
Figure 14:
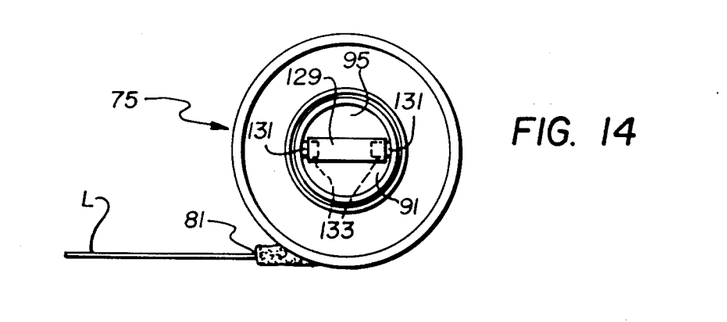
FIG. 14 is an end view of the third cartridge.
Figure 15:
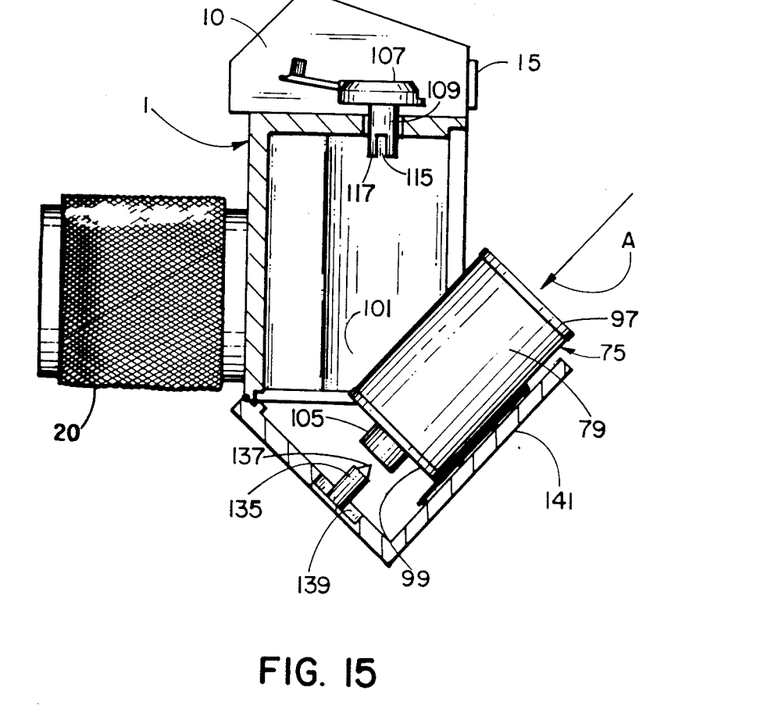
FIG. 15 is an elevation view, partly in section, of a camera modification for use with the third cartridge.

A third embodiment of the invention is shown in FIGS. 13-15. Those elements in FIGS. 13-15 which are the same as in the other figures have like reference numbers. In FIGS. 13 and 14, the fracturable element is a slip-on cap 129 removably attached to the respective end portions 131 of a pair of spaced ribs 133. The two ribs 133 are integrally formed with the core 87 and extend inwardly in converging relation in the longer coaxial hole 91. A post 135 having a pointed end 137 is positionable in the space between the two ribs 133 to pierce the cap 129 and thereby provide an indication to the photofinisher that the cartridge 75 was used in the pseudo format camera 1. As shown in FIG. 15, the camera 1 is modified to include the post 135 in a recess 139. The recess 139 is formed in the bottom of a rear door 141 of the camera to receive the short extension 105 of the core 87 as the cartridge is moved in the axial direction A onto the post 135. The post 135 is rotatably supported in the recess 139 to facilitate rotation of the film spool 77 by the rewind knob 107. In this instance, the keyed shaft 109 of the rewind knob 107 does not include a fracturing member as in the other two embodiments shown in FIGS. 8-12.

While the invention has been described with reference to preferred and alternate embodiments, it will be appreciated that still other modifications may be effected without departing from the scope of the invention. For example, in FIGS. 8 and 9, instead of depressing the rewind knob 107 axially to cause the fracturing member 121 of the keyed shaft 109 to fracture the thinned section 119 of the rib 111, the cartridge 75 may be moved axially toward the fracturing member to accomplish the same result. In this instance, of course, a bottom opening to the loading chamber 101 would be provided to enable such axial loading of the cartridge. In FIG. 13, instead of using a slip-on cap 129 as the fracturable element, the two ribs 133 may be connected at their respective ends 131 by an integrally formed strip-like section that could readily be fractured by the pointed end 137 of the post 135.

I claim:

1. An improved combination of (a) a film cartridge of the type including a film spool having an elongate coaxial hole open at one end of said spool and (b) a photographic camera of the type having a shaft member receivable in said coaxial hole at the open end of said spool, wherein the improvement comprises:

said spool including a fracturable element located within said coaxial hole; and said shaft member including means for fracturing said fracturable element as the shaft member is received in said coaxial hole, whereby an indication will be provided that said cartridge was used in said camera.

2. An improved combination of (a) a film cartridge of the type including a film spool having an elongate coaxial hole open at one end of said spool and an integral rib extending across said coaxial hole and (b) a photographic camera of the type having a film rewind shaft receivable in said coaxial hole at the open end of said spool for engaging said rib, wherein the improvement comprises:

said rib including a fracturable portion; and
said rewind shaft including means for fracturing said fracturable portion in response to engagement of the shaft with said rib, whereby an indication will be provided that said cartridge was used in said camera.

3. The improvement as recited in claim 2, wherein said fracturable portion of the rib is located opposite said open end of the spool, and said fracturing means of the rewind shaft is arranged to align with said fracturable portion as said rewind shaft is received in said coaxial hole.

4. The improvment as recited in claim 3, wherein said fracturable portion of the rib is substantially thinner than the remainder of said rib.

5. An improved combination of (a) a film cartridge of the type including a film spool having an elongate coaxial hole open at one end of said spool and an integral rib extending across said coaxial hole and (b) a photographic camera of the type having a film rewind shaft receivable in said coaxial hole at the open end of said spool for engaging said rib, wherein the improvement comprises:

said spool includes a fracturable disk-like element surrounding said rib at a location in said coaxial hole remote from said open end of the spool; and
said rewind shaft includes an extension having a pointed leading end for fracturing said disk-like element in response to engagement of the shaft with said rib, whereby an indication will be provided that said cartridge was used in said camera.

6. An improved combination of (a) a film cartridge of the type including a film spool having an elongate coaxial hole open at one end of said spool and a pair of spaced ribs extending along said coaxial hole and (b) a photographic camera of the type having a shaft member receivable in said coaxial hole at the open end of said spool, wherein the improvement comprises:

said spool including fracturable means bridging the space between said ribs at a location in said coaxial hole opposite said open end of the spool; and
said shaft member including means positionable in the space between said ribs for fracturing said fracturable means as the shaft member is received in said coaxial hole, whereby an indication will be provided that said cartridge was used in said camera.

7. The improvement as recited in claim 6, wherein said fracturable means includes a fracturable slip-on cap removably attached to said ribs to extend across the space between the ribs at a location proximate said open end of the spool.

8. An improved film cartridge for use in a photographic camera including a fracturing member, wherein said cartridge is of the type including a film spool, and wherein the improvement comprises:

means defining an elongate coaxial hole in said spool open at one end of the spool to receive the fracturing member; and
a readily fracturable indicator element disposed within said coaxial hole at a location opposite said open end of the spool to be fractured by the fracturing member as such member is received in said coaxial hole, whereby an indication will be provided that said cartridge was used in the camera.

9. An improved film cartridge for use in a photographic camera including a film rewind shaft having a fracturing member, wherein said cartridge is of the type including a film spool having an integral rib engageable with the rewind shaft, and wherein the improvement comprises:

fracturable indicator means positioned with respect to said rib for fracturing by the fracturing member in response to engagement of the rewind shaft with said rib, whereby an indication will be provided that said cartridge was used in the camera.

10. The improvement as recited in claim 9, wherein said indicator means includes a fracturable disk-like element surrounding said rib.

11. The improvement as recited in claim 9, wherein said indicator means includes a fracturable element integrally formed with said rib.

12. An improved film cartridge for use with a photograhic camera including a film rewind shaft having a fracturing member, wherein said cartridge is of the type including a film spool having an elongate coaxial hole open at one end of said spool to receive the rewind shaft and an integral rib extending across said coaxial hole for engagement with the rewind shaft, and wherein the improvement comprises:

said rib including a fracturable thinner portion disposed opposite said open end of the spool for fracturing by the fracturing member in response to engagement of the rewind shaft with said rib, whereby an indication will be provided that said cartridge was used in the camera.

13. An improved film cartridge for use with a photographic camera including a fracturing member, wherein said cartridge is of the type including a film spool, and wherein the improvement comprises:

means defining an elongate coaxial hole in said spool open at one end of the spool to receive the fracturing member;
a pair of ribs extending along said coaxial hole in spaced relation to receive the fracturing member between said ribs; and
a fracturable indicator element bridging the space between said ribs at a location in said coaxial hole opposite said open end of the spool to be fractured by the fracturing member as such member is received between said ribs, whereby an indication will be provided that said cartridge was used in the camera.

14. An improved photographic camera for use with a film cartridge including a film spool having an elongate coaxial hole open at one end of the spool and a fracturable indicator element within the coaxial hole, wherein the improvement comprises:

a shaft member receivable in the coaxial hole at the open end of the spool;
said shaft member including means for fracturing the fracturable indicator element as the shaft member is received in the coaxial hole, whereby an indication will be provided that the cartridge was used in said camera.

15. An improved photographic camera for use with a film cartridge including a film spool having an elongate coaxial hole open at one end of the spool and an integral rib and fracturable indicator element within the coaxial hole, wherein said camera is of the type including a film rewind shaft receivable in the coaxial hole at the open end of the spool to engage the rib, and wherein the improvement comprises:

means on said rewind shaft for fracturing the fracturable indicator element in response to engagement of said shaft with the rib, whereby an indication will be provided that the cartridge was used in said camera.

16. The improvement as recited in claim 15, wherein said rewind shaft includes a leading end having a split for receiving the rib to engage the rib, and said fracturing means includes a fracturing member disposed in said split to fracture the fracturable indicator element.

17. The improvement as recited in claim 15, wherein said fracturing means includes an extension of said rewind shaft having a pointed leading end for fracturing the fracturable indicator element.

18. An improved photographic camera for use with a film cartridge including a film spool having an elongate coaxial hole open at one end of the spool, a pair of spaced ribs in the coaxial hole, and a fracturable indicator element bridging the space between the ribs at a location in the coaxial hole opposite the open end of the spool, wherein said camera is of the type including a shaft member receivable in the coaxial hole at the open end of the spool, and wherein the improvement comprises:

said shaft member including means positionable in the space between the pair of ribs for fracturing the fracturable indicator element as said shaft member is received in the coaxial hole, whereby an indication will be provided that the cartridge was used in said camera.

* * * * *